US009427678B2

(12) United States Patent
Bechtel et al.

(10) Patent No.: US 9,427,678 B2
(45) Date of Patent: Aug. 30, 2016

(54) BASE FOR A MASS TRANSFER COLUMN
(71) Applicant: BASF SE, Ludwigshafen (DE)
(72) Inventors: Marcus Bechtel, Heidelberg (DE); Holger Friedrich, Worms (DE); Dieter Baumann, Speyer (DE); Sascha Müller, Ludwigshafen (DE)
(73) Assignee: BASF SE, Ludwigshafen (DE)
( * ) Notice: Subject to any disclaimer, the term of this patent is extended or adjusted under 35 U.S.C. 154(b) by 196 days.
(21) Appl. No.: 14/356,257
(22) PCT Filed: Nov. 14, 2012
(86) PCT No.: PCT/EP2012/072587
§ 371 (c)(1),
(2) Date: May 5, 2014
(87) PCT Pub. No.: WO2013/072353
PCT Pub. Date: May 23, 2013
(65) Prior Publication Data
US 2014/0284824 A1 Sep. 25, 2014

Related U.S. Application Data
(60) Provisional application No. 61/559,157, filed on Nov. 14, 2011.
(30) Foreign Application Priority Data
Nov. 14, 2011 (EP) .................................. 11188931
(51) Int. Cl.
B01F 3/04 (2006.01)
B01D 3/22 (2006.01)
(Continued)
(52) U.S. Cl.
CPC ............... B01D 3/324 (2013.01); B01D 3/166 (2013.01); B01D 3/18 (2013.01); B01D 3/22 (2013.01); B01F 3/04468 (2013.01); B01F 3/04496 (2013.01)

(58) Field of Classification Search
CPC .... B01F 3/04; B01F 3/04099; B01F 3/0446; B01F 3/04468; B01F 3/04496; B01D 3/22
USPC ................................ 261/114.1, 114.3, 114.5
See application file for complete search history.

(56) References Cited
U.S. PATENT DOCUMENTS
2,737,377 A * 3/1956 Huggins .................. B01D 3/18
202/158
3,168,600 A 2/1965 Martin
(Continued)

FOREIGN PATENT DOCUMENTS
DE 102007036180 A 2/2009
EP 2008054855 A 1/2010
WO WO-2008132096 A1 11/2008

OTHER PUBLICATIONS
English Translation of the International Preliminary Report on Patentability for PCT/EP2012/072587 dated Jun. 12, 2014.
(Continued)

Primary Examiner — Robert A Hopkins
(74) Attorney, Agent, or Firm — Drinker Biddle & Reath LLP

(57) ABSTRACT
The invention relates to a tray for a mass transfer column, having gas passage openings distributed over the tray (1), and having at least one baffle (11) for flow diversion of liquid flowing on the tray, it being possible for the tray (1) to be fed with a liquid via at least one entry (3). The tray has at least one entry (3), at least one separating weir (5), which separates the inflowing liquid into two streams, and at least two exits (12), or has at least two entries (3) and at least one exit (12) for the liquid, each stream flowing along a flow path (7; 9) to an exit (12). The invention further relates to a mass transfer column comprising the tray, and to a use of tray and mass transfer column.

13 Claims, 2 Drawing Sheets

(51) Int. Cl.
    *B01D 3/32*     (2006.01)
    *B01D 3/16*     (2006.01)
    *B01D 3/18*     (2006.01)

(56) References Cited

U.S. PATENT DOCUMENTS 3,434,701 A     3/1969   Bauer
4,265,736 A *   5/1981   Thayer .................... C10G 7/00
                                                                                  196/120
2009/0032980 A1    2/2009   Alzner

OTHER PUBLICATIONS

International Search Report for PCT/EP2012/072587 mailed Feb. 15, 2013.

* cited by examiner

BASE FOR A MASS TRANSFER COLUMN

CROSS-REFERENCE TO RELATED APPLICATIONS

This application is a national stage application (under 35 U.S.C. §371) of PCT/EP2012/072587, filed Nov. 14, 2012, which claims benefit of European Application No. 11188931.7, filed Nov. 14, 2011, both of which are incorporated herein by reference in their entirely.

The invention relates to a tray for a mass transfer column, having gas passage openings distributed over the tray, and having at least one baffle for flow diversion of liquid flowing on the tray, it being possible for the tray to be fed with a liquid via at least one entry.

Mass transfer columns are, for example, distillation columns, absorption columns or stripping columns, in which substances are separated by means of intense contact of liquid phase with gaseous phase. The liquid phase here runs from top to bottom through the column, while the gas phase rises from bottom to top through the column. Suitable internals bring the two phases into contact. Internals used include, for example, unordered packings, generally in the form of a bed, ordered packings, or trays. These trays are frequently configured as crossflow trays, where the liquid is supplied to the tray on one side, runs over the tray, and runs off from the tray via a downcorner opposite the supply point. Accommodated in the tray are mass transfer elements through which the gas rises through the liquid. The region in which the gas is supplied to the tray is also referred to as the "active area". In the entering downcorner, and in the exiting downcorner, there is a separation of liquid from entrained gas. The downcorners therefore act as a conduit for degassed liquid from one tray to the tray beneath it.

Mass transfer elements used on crossflow trays are, for example, sieve holes, fixed valves, moving valves, bubble caps or tunnel caps. The skilled person selects the mass transfer elements suitable for the particular application in dependence on that application—for example, in dependence on physical data, gas and liquid volumes, boundary conditions of the operation, and admissible temperatures or pressures. Sieve trays and valve trays are generally not hydraulically sealed.

As a result of the absence of hydraulic sealing from sieve trays and valve trays, the liquid is able to rain down on the lower tray through the mass transfer element before reaching the exiting downcorner. This liquid bypass results in a reduction in the contact between gas and liquid, and is therefore undesirable. The undesirable bypass can be prevented by selecting a gas load in the transfer element large enough to prevent premature raining by the upward flow of the gases. The opening ratio of the gas passage area, however, cannot be reduced ad infinitum, since reduced gas passage area is accompanied by a sharp rise in the pressure drop, thereby adversely affecting the efficiency of the process.

In the case of trays with long liquid run lengths, as for example in the case of a large diameter and hence a large distance between entering downcorner and exiting downcorner, or if the liquid is diverted from the entering downcorner to the circulation downcorner by corresponding disposition of baffles on the tray, a liquid gradient is established from the entry side to the exit side. A liquid gradient in this context means the decrease in the static pressure-drop component with the run length. Especially in the case of trays on which the flow path of the liquid is prolonged because of baffles or other flow guides, the tray tends toward uneven gassing and, consequently, toward raining in the entry region.

A large liquid run length may, however, be desirable—in order, for example, to obtain a sufficiently high contact time of liquid with the gas. For this purpose it is known, from DE-A 10 2007 036 180, for example, to dispose entering downcorner and exiting downcorner on the same side on a tray, and to provide, centrally between entering and exiting downcorners, a baffle around which the liquid on the tray is diverted. A further prolongation of the flow path can be accomplished, for example, by providing a larger number of baffles, so that the liquid runs in a meandering path over the tray.

If, in the process performed in the mass transfer column, it is necessary to supply or remove heat, it is known practice to provide heat transfer elements on the tray, in the form, for example, of pipes through which a temperature control medium flows. In order to maximize the heat exchange surface, the pipelines that are used for heat exchange are run for as long as possible on the tray, and the liquid is conducted along these pipes by means of baffles on the tray. By this means the run length is deliberately prolonged significantly. This effect is boosted in the case of large column diameters. Where pipelines are used for heat exchange on the trays, it has emerged that uniform gassing of the tray is additionally hindered and, therefore, that rainthrough occurs to an increased extent. In order to remove heat from the liquid or to supply heat to the liquid on the tray, the pipes through which the temperature control medium flows are typically disposed in a plurality of layers, with pipes lying parallel. It is usual to use 1 to 4 layers, each comprising 4 to 20 parallel pipes. Corresponding trays in mass transfer columns on which heat transfer elements are disposed in the form of pipes are described in WO-A 2008/132096, for example.

The liquid is fed to the tray typically by causing it to overflow via an inlet weir. This inlet weir generally has a height of between 15 to 250 mm. If heat transfer elements are provided on the tray, the liquid has to flow through laterally between the individual heat transfer elements in order to reach the region of longitudinal flow. Here it has emerged that, in the case both of heat transfer elements with longitudinal flow impingement and of heat transfer elements with transverse flow impingement, the gassing of the tray of the mass transfer column is made much more difficult, and the tray rains down persistently over a longer liquid stretch. This raining-through tendency on the part of the mass transfer column increases in line with decreasing load, especially in the partial load range.

It is an object of the present invention, therefore, to provide a tray for a mass transfer column with which the raining-through of liquid is durably minimized. Another object is to expand downwardly the operating range of the mass transfer column—that is, to operate the mass transfer column as far as possible without liquid raining-through, or with only a low level of liquid raining-through, even in the partial load range.

This object is achieved by means of a tray for a mass transfer column, having gas passage openings distributed over the tray, and having at least one baffle for flow diversion of liquid flowing on the tray, it being possible for the tray to be fed with a liquid via at least one entry, wherein the tray has at least one entry, at least one separating weir, which separates the inflowing liquid into two streams, and at least two exits or has at least two entries and at least one exit for the liquid, each stream flowing along a flow path to an exit.

As a result of the division of the liquid into two streams, the liquid run lengths on the tray are shortened. As a result of this, the gassing of the tray in the inlet region of the liquid is made easier, resulting in a uniform onset when the mass transfer column is started up. Raining down of liquid through the tray and the associated deterioration in separation efficiency as a result of liquid bypass to the next tray can be effectively reduced in this way. The operating range of the trays is extended downwardly in this way, thereby enabling operation even with a relatively small partial load.

In one preferred embodiment, the flow paths on the tray are designed such that the length of each flow path is substantially the same. As a result of the flow path lengths being substantially the same, it is ensured that the liquid flowing over the tray has a comparable residence time on the tray independently of the flow path taken, and so is treated equally, with the consequence, for example, in an absorption column, that the emerging liquid has a substantially identical composition in each case, irrespective of the path taken.

In order to make the length of the flow paths substantially the same, it is particularly preferred for the separating weir to form two flow paths on the tray which are symmetrical to one another. For this purpose, the separating weir serves, for example, as an axis of symmetry.

In a mass transfer column comprising the tray of the invention, one possibility is to provide trays each of the same design one above another, in which case the at least two exits of one tray are brought together to form the entry for the next tray. It is preferred, however, to provide trays alternately in each case, with the exits of the upper tray being utilized as the entry for the tray beneath in each case. Accordingly, above and below a tray having one exit and two entries, there is in each case a tray having two exits and one entry.

If more than two flow paths are provided, it is possible, for example, for trays having one entry and two or more exits and, beneath them, trays having two or more entries and one exit to be disposed above one another in alternation, with the number of exits or the number of entries corresponding in each case to the number of flow paths. The design in this case is preferably such that the exits of one tray form the entries for the underlying tray in each case. It is particularly preferred, moreover, if the flow paths on the individual trays correspond, so that the liquid on the trays flows in opposite directions in alternation in each case.

For the gassing of the individual trays, gas passage openings provided may be, for example, sieve holes, bubble-caps, tunnels, fixed valves or moving valves. It is particularly preferred if the gas passage openings are sieve holes. The number and the diameter of the individual sieve holes in this case is dependent on the volume of gas conducted through the column and also, furthermore, on the diameter of the column and hence on the diameter of the trays.

If the mass transfer process performed in the column is one in which heat is released or in which it is necessary to supply heat, it is additionally preferred to dispose heat transfer elements on the tray. The heat transfer elements in this case are preferably disposed along the flow paths on the tray. By disposing the heat transfer elements along the flow path on the tray, the liquid flows along the heat transfer elements and so can be either heated or cooled by the heat transfer elements.

Suitable heat transfer elements are any desired heat transfer elements known to the skilled person. Thus, for example, electrically heated heat transfer elements may be provided for heating. As heat transfer elements, however, it is preferred to provide pipelines through which a temperature control medium flows. These pipelines extend more preferably parallel to the flow path on the tray.

If the mass transfer process carried out is one in which heat is released, the pipelines have a coolant flowing through them. The temperature of this coolant is below the temperature of the liquid in the column, and so heat can be absorbed by the coolant. Correspondingly, in the case of a mass transfer process in which heat has to be supplied, a hot temperature medium is conducted through the pipes. An example of a suitable heating medium here is steam.

In order to enlarge the heat exchange area it is possible to lay the pipelines in meandering form on the flow path. In this case, the liquid then flows on the tray in cross-countercurrent or cross-cocurrent to the liquid in the pipelines. It is preferred, however, to make the pipelines parallel to the flow path, so that the liquid on the tray flows in cocurrent or in countercurrent to the temperature control medium in the pipelines. In this case, for increasing the heat exchange area, it is especially preferred if two or more pipelines run parallel alongside one another on the flow path. The plurality of pipelines running parallel alongside one another on the flow path each form a layer. Depending on the height of liquid on the tray and on the diameter of the individual pipes, it is possible to provide a plurality of layers of pipelines one above another. In this case, the pipelines may be disposed flush above one another or in each case with an offset to one another.

Depending on the width of the flow path on the tray, it is preferred to dispose 4 to 20 pipelines in parallel to one another, which then form a layer. It is particularly preferred to dispose 6 to 16 pipes parallel alongside one another. The number of layers of pipelines is preferably in the range 1 to 6, more preferably 1 to 4.

In order to supply the pipelines with a temperature control medium, it is possible, for example, to dispose a distributor on the tray, to which the pipelines are connected and via which the pipelines are filled with the temperature control medium. At the other end of the pipelines there is a collector in which the temperature control medium is collected and taken off from the tray. In order to be able to supply the temperature control medium, the collector and the distributor are each passed with at least one port through the walls of the column in which the tray is accommodated. This collector and distributor can also be integrated into the column wall. In this case, the pipes are taken through a plate in a fluid-tight manner, and open out into a port on the column wall. This produces better accessibility and, in association with this, the possibility for repair of the pipes from the outside as well.

The pipelines used for temperature control may in one case extend over all of the flow paths on a tray; alternatively, however, it is also possible for each flow path to be assigned separate pipelines for temperature control. In order to obtain an extremely simple construction, however, it is preferred to design the pipelines in such a way that each pipeline runs along all the flow paths. As a result of this, one port for the supply of the temperature control medium and one port for the removal of the temperature control medium are sufficient. If separate pipelines are provided on each flow path, then the ports for the temperature control medium must also be provided for each flow path. It is also possible, furthermore, to take the pipelines out and back again over all of the flow paths on a tray, so that entry and exit to the pipelines are positioned alongside one another. This pipeline regime results in a lower requirement for temperature control medium.

In order to be able to guide the liquid uniformly on the tray, it is preferred if each entry comprises an entry weir. Via the entry weir, the liquid then flows into the respective flow paths. The entry weir preferably has a height in the range from 15 to 250 mm, more particularly in the range from 25 to 150 mm. The entry weir is preferably provided on its top side with a structured edge. The structured edge may have, for example, a zigzag, corrugated or crenellated design. It is also possible, furthermore, to provide windows in the weir for the entry of the liquid. These windows may be provided alternatively or additionally to the structured edge. The structuring of the edge, and the windows, achieve a uniform distribution of the liquid over the entire width of the entry weir.

The height of the zigzags, corrugations or crenellations, and the size of the windows, are dependent on the volume of liquid to be distributed. Preferably, the individual zigzags of the zigzag design, the individual corrugations of the corrugated design or the individual crenellations have a height of 5 to 50 mm, more preferably of 10 to 25 mm.

Alternatively or additionally to the distribution of the liquid via an entry weir, it is also possible to provide a liquid distributor which is disposed above the tray and has outflow openings through which the liquid is distributed uniformly onto the flow pathways. For this purpose it is necessary to dispose the liquid distributor above the at least two flow paths in such a way that all of the flow paths are supplied with liquid flow via the liquid distributor. The distance of the bottom side of the liquid distributor and hence of the outflow openings to the tray is preferably at a distance of 1 to 50 cm, more preferably of 5 to 30 cm and very preferably of 10 to 15 cm above the topmost point of the heat transfer elements disposed on the tray. In order to be able to adapt the liquid distributor to changing requirements, as a result of a different liquid loading in the column, for example, it is possible to mount the liquid distributor in such a way as to be adjustable by means, for example, of threaded rods. If a liquid distributor of this kind is provided, it is preferably positioned above the liquid contained on the tray, referred to as the froth layer.

The design of the liquid distributor is such, for example, that it comprises a housing provided with the outflow openings, the housing accommodating an overflow container to which the liquid to be distributed is supplied. The liquid then runs out of the overflow container into the housing, from where it is distributed via the outlet openings onto the underlying tray.

A liquid distributor of this kind is described in EP-A 2008/054855, for example. Using a liquid distributor of this kind, which brings about an improved onset behavior and a greater load range in the partial load direction, in combination with the tray of the invention, results in an additional extension to the partial load capacity.

The invention further provides a mass transfer column which comprises at least one of the trays designed in accordance with the invention. Preferably each tray in the mass transfer column is configured as described above. With particular preference the mass transfer column is designed such that, in each case in alternation, trays having two exits and one entry and trays having two entries and one exit are disposed one above another, with the exits of the upper tray forming the entries of the tray beneath in each case.

Each exit of a tray comprises an exit region having at least one exiting downcorner, through which the liquid is conducted into the entry of the underlying tray. This exiting downcorner ends in the entry, delimited by the entry weir, or in the liquid distributor. The exiting downcorners in the exit region may be in any desired disposition. Thus, for example, two exiting downcorners may be provided, located on opposite sides of the exit region. Alternatively, there may also be two or more exiting downcorners alongside one another on one side of the exit region. It is also possible to provide only one exiting downcorner in the exit region. It is also possible to provide an exiting downcorner for each flow path, with all of the exiting downcorners then opening out in a joint entry for the underlying tray. In the case of one exit from a tray, it is preferred to mix the liquid of the individual flow paths in the exit region, before it is applied to the next tray. This mixing may also be accomplished by providing only one, joint exiting downcorner. In order to assist the mixing, it is additionally possible to provide static mixing elements in the exit region or in the exiting downcorner.

The column formed in accordance with the invention, with the trays of the invention, is used preferably for preparing nitric acid. In this case, the column serves as an absorption column, with the heat of absorption, produced in the absorption column in the course of operation, being taken off through the heat transfer elements disposed on the tray, these elements being designed in this case as a cooling element.

For the preparation of nitric acid, ammonia is first combusted catalytically with air over platinum meshes to form carbon monoxide and water. This reaction is carried out to complete conversion, with an excess of oxygen. The nitrogen monoxide is oxidized further to nitrogen dioxide homogeneously by the excess oxygen.

The nitrogen dioxide is supplied to the absorption column as a gas stream. As the liquid, water is added to the absorption column at the top. In the column, the nitrogen dioxide is absorbed by the water, producing nitric acid and nitrogen monoxide.

A multitude of reactions proceed in the absorption column, both in the gas phase and in the liquid phase. The heats of reaction and heats of absorption that occur are taken off via the heat transfer elements on the tray. As a result of the removal of the heat, the equilibriums in the individual reactions are shifted appropriately. Moreover, the losses of $NO_x$ at the top of the absorption column must be minimized. Attainment of the specifications for the products removed from the column is heavily dependent on the column design. By using an absorption column with the trays of the invention, liquid raining down during the preparation of nitric acid is greatly reduced and an expansion is achieved in the operating range, downwardly, thereby improving the partial load capacity.

The liquid may be added to the column via, for example, an external feed or by addition via an internal liquid stream, as for example an exiting downcorner or an annular channel or the like. This liquid passes via an entry pipe into the overflow container for example from outside the column and/or via the exiting downcorner of a tray situated above it, or, for example, through a pipe from an annular channel.

In order to prevent bypass flow of the gas through the downcorner, it is necessary to provide the exiting downcorner or the pipe of the annular channel with a gas-tight closure. For this purpose, the overflow container is installed in the housing. The exiting downcorner opens into the overflow container below the liquid level. The exiting downcorner here opens out into the liquid at preferably between 10 to 200 mm, more preferably between 20 to 100 mm and very preferably from 30 to 50 mm. The liquid level in the overflow container is specified by the height of the overflow container. This ensures that the exiting downcorner or the pipe opening out from the annular channel is sealed in the housing independently of the liquid level. The vertical distance of the overflow container to the housing ought to be 10 to 250 mm, preferably from 20 to 150 mm and more preferably 10 to 100 mm. At the top edges, the overflow container preferably has a series of overflow jags with a height of 2 to 20 mm, more preferably 10 to 15 mm, in order to produce uniform distribution of the liquid into the housing.

With the liquid distributor, the liquid ought preferably to be distributed at the furthest point of the liquid offtake as uniformly as possible via the heat transfer elements to the feed line or removal line of the heat transfer medium thereof. In the case of heat transfer elements which extend in a meandering form along the flow paths, the supply of liquid is preferably central via the heat transfer elements.

Using a submerged liquid system effectively prevents gas rising in the form of a bypass through the exiting downcorner. It is ensured that the entire gas flows through the gas passage openings in the tray. The submerged liquid system is realized by ending the at least one exiting downcorner beneath the level of liquid in the entry of the underlying tray.

Working examples of the invention are shown in the figures and illustrated in more detail in the description below.

In the drawings

Figure 1:
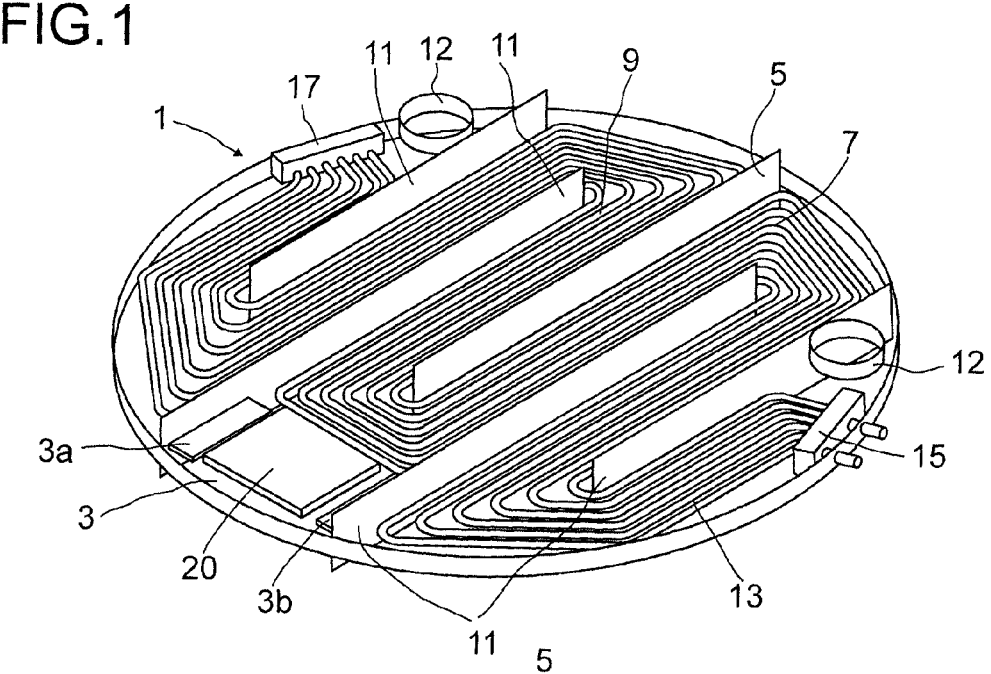
FIG. 1 shows a three-dimensional view of an inventively designed tray having two flow paths.

An inventively designed tray 1 has an entry with an entry region 3 via which the tray 1 is fed with a liquid. For this purpose, the liquid flows from the entry region 3 onto the tray 1. The entry region 3 here is preferably limited by an entry weir. In accordance with the invention, the liquid is separated by a separating weir 5 into a first flow path 7 and a second flow path 9. In the embodiment shown here, the first flow path 7 and the second flow path 9 are designed axially symmetrical to the separating weir 5.

In the embodiment shown here, each of the flow paths 7, 9 has two baffles 11, around which the liquid is diverted, so that it travels a meandering path. Located at the end of the flow path 7, 9 is an exiting downcorner 12. The liquid flows from the tray through the exiting downcorner 12, to an underlying tray or into the bottom, from which the liquid can then be taken off. If there is a further tray located beneath the tray, the exiting downcorners 12 are at the same time the entries for the underlying tray.

In accordance with the invention, there are also heat transfer elements 13 located on the tray, and in the embodiment shown here they are designed as pipelines. The heat transfer elements 13 are utilized in order to take off heat produced in a mass transfer process carried out on the tray, or to supply heat needed for a mass transfer process. Where the mass transfer column with the inventive tray 1 is used in the preparation of nitric acid, heat of absorption is released, and can then be taken off via the heat transfer elements 13. In order to obtain a sufficiently large heat transfer area, a plurality of pipelines run as heat transfer elements 13 in parallel via the flow paths 7, 9 formed on the tray 1, from a distributor 15, via which a temperature control medium is applied to the pipeline, to a collector 17. In the collector 17, the temperature control medium from all of the pipelines runs together and can then be drawn off from the tray.

In addition to the embodiment shown here, in which one layer of pipelines positioned alongside one another is disposed, it is also possible for more than one layer of pipelines to be positioned one above another. In this case, the pipelines may be disposed each flush above one another or else with an offset to one another. The number of layers of pipelines used is dependent on the diameter of the pipes and on the height of the liquid level on the tray in ongoing operation. The number of layers of pipelines should be selected such that all of the pipelines in operation are always covered by liquid.

Figure 2:
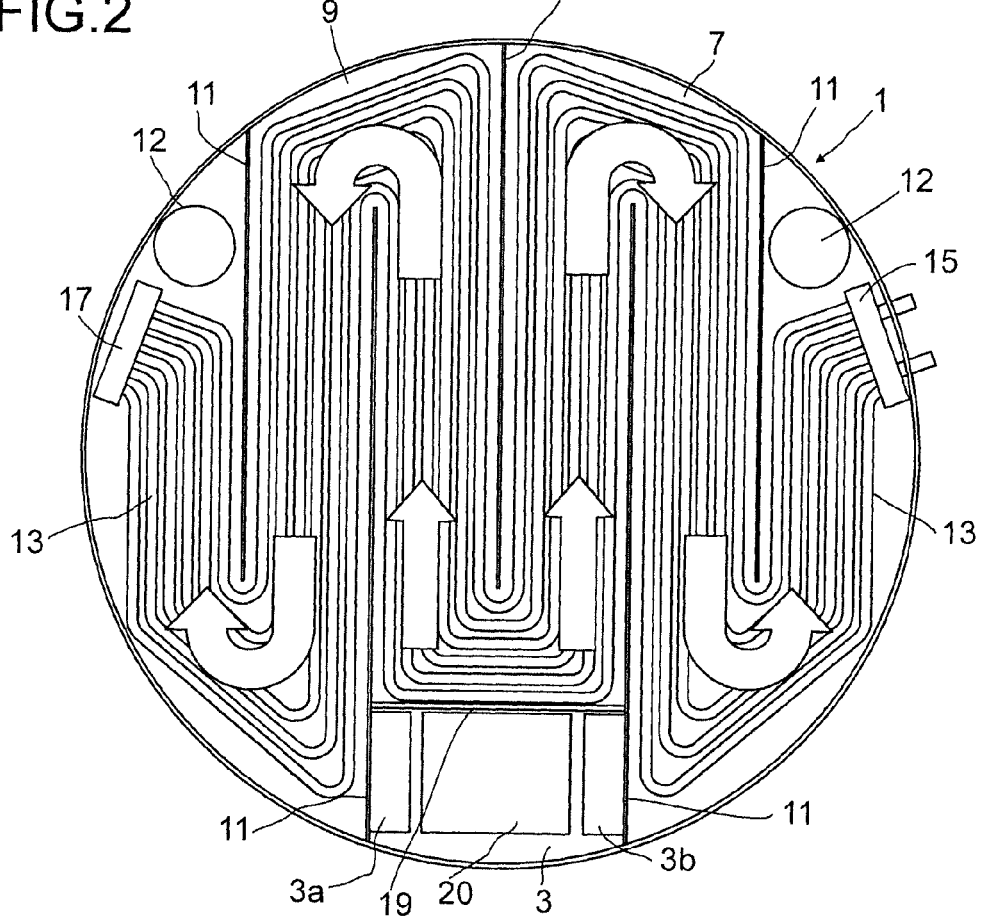
FIG. 2 shows a plan view of an inventively designed tray having two flow paths.

A plan view of the inventively designed tray having two flow paths is shown in FIG. 2.

The tray 1 is supplied with the liquid via the entry region 3, which is fed with liquid from an overlying tray via two exiting downcorners 3a, 3b. The liquid flows onto the tray 1 via an entry weir 19. A uniform distribution of the liquid over the entire width of the entry weir 19 is achieved by the entry weir 19 having a structured top edge. The edge may have, for example, a zigzag, corrugated or crenellated design. Alternatively it is also possible to provide windows in the entry weir 19, through which the liquid will be distributed.

In addition to the variant shown here, having two exiting downcorners 3a, 3b of the overlying tray, which end in the entry region 3 and are disposed on two opposite sides of the entry region 3, it is also possible to dispose one or more exiting downcorners parallel to the entry weir 19 in the entry region 3, or to position the exiting downcorners along the column wall. In order to avoid upward rise of gas through the exiting downcorners 3a, 3b, they preferably end below the liquid level in the entry region 3. Correspondingly, the exiting downcorners 12 also end below the liquid level of the entry of the underlying tray, in order to prevent gas passage.

After the entry weir 19 has been overflowed, the liquid is distributed onto the two flow paths 7, 9. The flow of the liquid is shown here with arrows, and runs from the entry 3 via the entry weir 19 along the first flow path 7 or the second flow path 9 to the associated exiting downcorner 12.

If there is a further tray located in the column beneath the tray 1, then it is particularly preferred for said tray to have an entry at each of the positions at which the tray shown here has the exiting downcorners 12. The liquid then flows via the respective entry into the first flow path 7 or second flow path 9, and flows, opposite to the direction shown in FIG. 2, along the flow paths 7, 9. The liquid is then collected in an exit which lies at the position at which the entry is in the embodiment shown in FIG. 2. The construction of a tray positioned above the tray shown here is also corresponding.

In the embodiment shown in FIGS. 1 and 2, there is additionally a rise-through opening 20 located in the entry region 3, which is closed in operation.

In addition to the embodiment shown in FIGS. 1 and 2, with two symmetrical flow paths, it is also possible, alternatively, to provide more than two flow paths or to make the flow paths nonsymmetrical. It is advantageous, however, to give the individual flow paths each substantially the same length, irrespective of the number and design of the flow paths.

Alternatively to the entry of the liquid via an entry weir 19, as shown in FIG. 2, the distribution of liquid via a liquid distributor is possible as well. A liquid distributor of this kind is shown schematically in FIG. 3 in side elevation and in FIG. 4 in plan view.

A liquid distributor 21 comprises a housing 23, the bottom side of the housing 23 having outflow openings 25, here shown schematically by means of arrows. The outflow openings may be disposed, for example, in rows on the base of the housing 23. In that case it is possible to design the outflow openings 25, for example, in the form of individual holes having a round cross section, or else as slots. In order to obtain uniform distribution of the liquid, the outflow openings 25 are disposed in uniform distribution over the base of the housing 23.

The liquid to be distributed via the liquid distributor 21 is supplied via an exiting downcorner 12 to an overflow container 29. If the liquid distributor 21 is located above the uppermost tray in the column, the liquid is preferably supplied via an immersed pipe from a liquid distributor.

The exiting downcorner 12 opens into the overflow container 29, and so the outlet from the exiting downcorner 12 is disposed below the level 31 of liquid in the overflow container 29. As a result of this, a seal is produced relative to gas in the column, and so no gas can flow into the exiting downcorner 12.

The liquid subsequently flows from the overflow container 29 into the housing 23, in which it flows over the side walls of the overflow container 29. From the housing 23, the liquid then flows through the outflow openings 25 onto the tray 1.

In order to obtain a uniform distribution of liquid onto the individual flow paths, the liquid distributor 21 is located preferably centrally above the separating weir 5.

Figure 3:
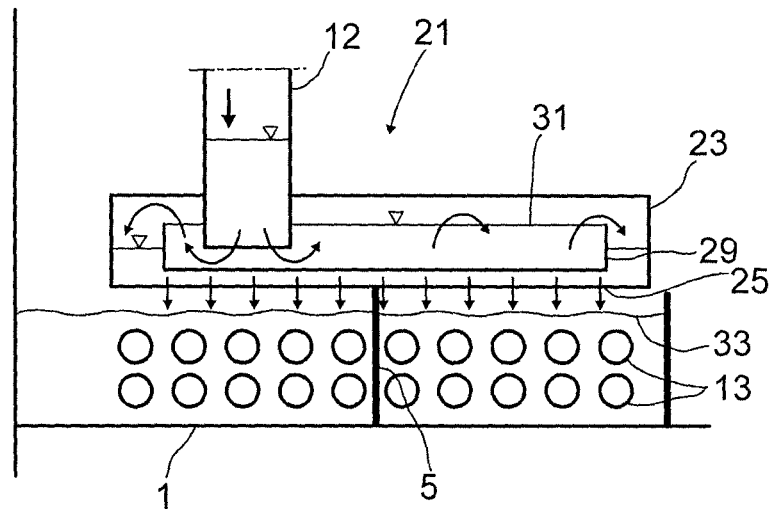
FIG. 3 shows a schematic view of a liquid distributor in side elevation.
Figure 4:
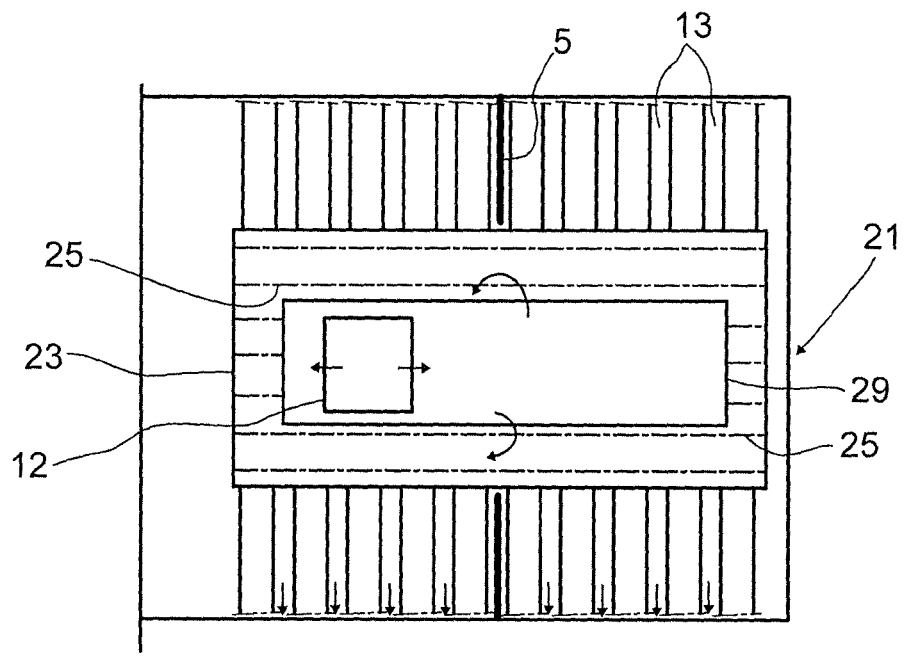
FIG. 4 shows a schematic view of the liquid distributor from FIG. 3 in plan view.

In the embodiment shown in FIG. 3, two layers of heat transfer elements are provided for the purpose of temperature control of the liquid on the tray 1, the heat transfer elements each being designed in the form of pipelines and being disposed flush above one another in individual layers. The heat transfer elements 13 are completely covered by the liquid present on the tray 1. The liquid level of the liquid on the tray 1 is designated by reference symbol 33.

In accordance with the invention, the liquid distributor 21 is disposed above the liquid level 33 on the tray 1. The liquid therefore flows first from the liquid distributor 21 through the outflow openings 25 through gas, before it impinges onto the liquid on the tray. The flow of the liquid in the liquid distributor is shown schematically with arrows in each case in FIGS. 3 and 4.

For the distribution of the liquid on the tray, the outflow openings 25 are disposed preferably in 1 to 30 rows, more preferably in 2 to 20 rows and very preferably in 3 to 7 rows. In this case, each of the rows has 10 to 50, preferably 20 to 40, holes. The individual rows are disposed preferably parallel to the outer edges of the housing 23. The orientation of the liquid distributor 21 in this case is preferably such that the rows of outflow openings 25 are disposed preferably at an angle of 30° to 90° over the longitudinal direction of the pipes of the heat transfer elements 13. This disposition allows extremely uniform distribution of the liquid in flow direction over all of the parallel pipes 13.

The diameter of the outflow openings is situated preferably in the range from 1 to 30 mm, more preferably 5 to 20 mm, very preferably 7 to 12 mm.

In order to ensure a particularly uniform liquid distribution, it is advantageous if the housing 23 has a sag of not more than 2 mm at the bottom side, and an evenness of the level gradient of less than 1 mm per 1 m length. This sag may readily be obtained with a suitable selection of material or by means of structural measures, such as reinforcing ribs, for example.

LIST OF REFERENCE SYMBOLS

1 Tray
3 Entry
3a, 3b Exiting downcorner
5 Separating weir
7 First flow path
9 Second flow path
11 Baffle
12 Exiting downcorner
13 Heat transfer element
15 Distributor
17 Collector
19 Entry weir
20 Rise-through opening
21 Liquid distributor
23 Housing
25 Outflow openings
29 Overflow container
31 Liquid level
33 Liquid level on the tray 1

The invention claimed is:

1. A tray for an absorption column for preparing nitric acid, having gas passage openings distributed over the tray (1), and having at least one baffle (11) for flow diversion of liquid flowing on the tray, it being possible for the tray (1) to be fed with a liquid via at least one entry (3), and wherein heat transfer elements (13) are disposed on the tray (1) along the flow paths (7; 9) in each case, the heat transfer elements being designed as cooling elements, wherein the tray has at least one entry (3), at least one separating weir (5), which separates the inflowing liquid into two streams, and at least two exits (12), or has at least two entries (3) and at least one exit (12) for the liquid, each stream flowing along a flow path (7; 9) to an exit (12).

2. The tray according to claim 1, wherein the flow paths (7; 9) are designed so that the length of each flow path (7; 9) is substantially the same.

3. The tray according to claim 1, wherein baffles (11) are disposed on the tray (1) for flow diversion, so that meandering flow paths (7; 9) are formed by the baffles (11).

4. The tray according to claim 1, wherein the separating weir (5) forms two flow paths (7; 9) on the tray (1) which are symmetrical to one another.

5. The tray according to claim 1, wherein the gas passage openings are sieve holes, bubblecaps, tunnel caps, fixed valves or moving valves.

6. The tray according to claim 1, wherein the heat transfer elements (13) are pipelines through which a temperature control medium flows.

7. The tray according to claim 6, wherein the pipelines extend parallel to the flow path (7; 9).

8. The tray according to claim 6, wherein 4 to 20 pipelines disposed parallel to one another form one layer in each flow path (7; 9), and 1 to 4 layers are disposed one above another.

9. The tray according to claim 1, wherein the entry (3) comprises an entry weir (19) via which the liquid flows into the respective flow paths (7; 9).

10. A mass transfer column for intense contact of a gaseous phase with a liquid phase for preparing nitric acid, the liquid phase being added via a liquid distributor at the top of the mass transfer column and the gas phase being added via a gas distributor at the bottom of the mass transfer column, a gas phase being taken off at the top of the mass transfer column and a liquid phase being taken off at the bottom of the mass transfer column, wherein the mass transfer column comprises at least one tray according to claim 1.

11. The mass transfer column according to claim 10, comprising at least two trays according to claim 1, where each tray, always in alternation, has one entry and two exits, and a tray lying directly under it or over it has two entries and one exit, and in each case the at least one exit of one tray forms the entry of an underlying tray.

12. A tray for an absorption column for preparing nitric acid, having gas passage openings distributed over the tray (1), and having at least one baffle (11) for flow diversion of liquid flowing on the tray, it being possible for the tray (1) to be fed with a liquid via at least one entry (3), and wherein heat transfer elements (13) are disposed on the tray (1) along the flow paths (7; 9) in each case, the heat transfer elements being designed as cooling elements, wherein the tray has at least one entry (3), at least one separating weir (5), which separates the inflowing liquid into two streams, and at least two exits (12), or has at least two entries (3) and at least one exit (12) for the liquid, each stream flowing along a flow path (7; 9) to an exit (12), and wherein the entry (3) comprises a liquid distributor (21) which is disposed above the tray (1) and has outlet openings (25) through which the liquid is distributed uniformly onto the flow paths (7; 9).

13. The tray according to claim 12, wherein the liquid distributor (21) comprises a housing (23) provided with the outflow openings (25), the housing (23) accommodating an overflow container (29) to which the liquid to be distributed is supplied.

\* \* \* \* \*